United States Patent
Bogushefsky, III et al.

(10) Patent No.: US 11,074,068 B1
(45) Date of Patent: *Jul. 27, 2021

(54) SYSTEMS AND METHODS OF A METADATA ORCHESTRATOR AUGMENTING APPLICATION DEVELOPMENT

(71) Applicant: Wells Fargo Bank, N.A., San Francisco, CA (US)

(72) Inventors: Joseph Albert Bogushefsky, III, Gilbert, AZ (US); Christopher Thomas Miller, Pleasant Hill, IA (US); Dennis Wayne Wilson, Waukee, IA (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/715,893

(22) Filed: Dec. 16, 2019

Related U.S. Application Data

(63) Continuation of application No. 15/683,305, filed on Aug. 22, 2017, now Pat. No. 10,521,223.

(51) Int. Cl.
| | | |
|---|---|---|
| *G06F 17/00* | (2019.01) | |
| *G06F 9/44* | (2018.01) | |
| *G06F 11/20* | (2006.01) | |
| *G06F 8/73* | (2018.01) | |
| *G06F 8/30* | (2018.01) | |

(Continued)

(52) U.S. Cl.
CPC ............... *G06F 8/73* (2013.01); *G06F 8/30* (2013.01); *G06F 8/60* (2013.01); *G06F 8/71* (2013.01); *G06F 8/76* (2013.01); *G06F 11/3688* (2013.01); *G06F 9/455* (2013.01); *G06F 11/3006* (2013.01); *G06F 40/177* (2020.01)

(58) Field of Classification Search
CPC ..... G06F 8/73; G06F 8/30; G06F 8/60; G06F 8/71; G06F 8/76; G06F 9/455; G06F 11/3688; G06F 11/3006; G06F 40/177
See application file for complete search history.

(56) References Cited

U.S. PATENT DOCUMENTS

| | | | |
|---|---|---|---|
| 6,449,627 B1 * | 9/2002 | Baer | G06F 16/958 715/206 |
| 6,865,573 B1 * | 3/2005 | Hornick | G06F 16/252 707/748 |

(Continued)

OTHER PUBLICATIONS

Eduard Hovy et al., Extending Metadata Definitions by Automatically Extracting and Organizing Glossary Definitions, May 2003, [Retrieved on Feb. 28, 2021], Retrieved from the internet: <URL: https://dl.acm.org/doi/pdf/10.5555/1123196.1123249> 6 Pages (1-6) (Year: 2003).*

(Continued)

*Primary Examiner* — Anibal Rivera
(74) *Attorney, Agent, or Firm* — James J. Pingor

(57) ABSTRACT

Systems and methods that augment an entity's building and deployment of multiple applications using a metadata library component and a metadata orchestrator that controls details of the configurations of data stores, metadata which may include linkage rules of the metadata structures and that leverages the metadata across individual application development and completed application silos are discussed.

20 Claims, 7 Drawing Sheets

(51) Int. Cl.
*G06F 8/76* (2018.01)
*G06F 11/36* (2006.01)
*G06F 8/60* (2018.01)
*G06F 8/71* (2018.01)
*G06F 40/177* (2020.01)
*G06F 9/455* (2018.01)
*G06F 11/30* (2006.01)

(56) References Cited

U.S. PATENT DOCUMENTS

| | | | |
|---|---|---|---|
| 6,986,102 B1* | 1/2006 | Baer | G06F 16/284 |
| | | | 715/206 |
| 7,076,494 B1* | 7/2006 | Baer | G06F 16/95 |
| 7,149,730 B2* | 12/2006 | Mullins | G06F 16/289 |
| 7,340,481 B1* | 3/2008 | Baer | G06F 40/166 |
| 7,356,766 B1* | 4/2008 | Baer | G06F 16/958 |
| 7,680,767 B2* | 3/2010 | Adya | G06F 16/24539 |
| | | | 707/999.002 |
| 8,271,336 B2* | 9/2012 | Mikurak | G06Q 30/0261 |
| | | | 705/22 |
| 9,158,827 B1* | 10/2015 | Vu | G06F 16/254 |
| 9,678,683 B1* | 6/2017 | Chen | G06F 9/50 |
| 2002/0091702 A1* | 7/2002 | Mullins | G06F 16/25 |
| 2002/0152244 A1* | 10/2002 | Dean | G06F 40/166 |
| | | | 715/255 |
| 2003/0208505 A1* | 11/2003 | Mullins | G06F 16/289 |
| 2004/0044637 A1* | 3/2004 | Vachuska | G06F 16/284 |
| 2004/0044687 A1* | 3/2004 | Vachuska | G06F 16/289 |
| 2004/0044989 A1* | 3/2004 | Vachuska | G06F 9/4493 |
| | | | 717/108 |
| 2004/0123048 A1* | 6/2004 | Mullins | G06F 16/9574 |
| | | | 711/141 |
| 2004/0177093 A1* | 9/2004 | Mullins | G06F 16/289 |
| 2005/0149907 A1* | 7/2005 | Seitz | G06F 9/5016 |
| | | | 717/108 |
| 2006/0085465 A1* | 4/2006 | Nori | G06F 16/213 |
| 2006/0184568 A1* | 8/2006 | Barcia | G06F 16/258 |
| 2006/0212855 A1* | 9/2006 | Bournas | G06Q 10/06 |
| | | | 717/140 |
| 2006/0224617 A1* | 10/2006 | Inmon | G06Q 10/10 |
| 2007/0011605 A1* | 1/2007 | Dumitru | G06F 16/957 |
| | | | 715/235 |
| 2007/0136311 A1* | 6/2007 | Kasten | H04L 67/28 |
| 2008/0189240 A1* | 8/2008 | Mullins | G06F 16/25 |
| 2009/0070786 A1* | 3/2009 | Alves | G06F 9/541 |
| | | | 719/318 |
| 2010/0211420 A1* | 8/2010 | Kodi | G06Q 10/06 |
| | | | 717/140 |
| 2010/0211939 A1* | 8/2010 | Ali | G06F 8/42 |
| | | | 717/143 |
| 2011/0083120 A1* | 4/2011 | Bhandar | G06F 8/71 |
| | | | 717/121 |
| 2011/0106810 A1* | 5/2011 | Huck | G06F 16/972 |
| | | | 707/741 |
| 2012/0079450 A1* | 3/2012 | Reech | G06F 16/185 |
| | | | 717/104 |
| 2013/0219307 A1* | 8/2013 | Raber | G06F 8/38 |
| | | | 715/763 |
| 2013/0246996 A1* | 9/2013 | Duggal | G06F 8/35 |
| | | | 717/104 |
| 2013/0297654 A1* | 11/2013 | Khimich | G06F 21/6227 |
| | | | 707/783 |
| 2013/0325789 A1* | 12/2013 | Krishnan | G06F 16/254 |
| | | | 707/602 |
| 2014/0279201 A1* | 9/2014 | Iyoob | G06F 9/5077 |
| | | | 705/26.7 |
| 2014/0372533 A1* | 12/2014 | Fu | G06F 9/5072 |
| | | | 709/204 |
| 2015/0127668 A1* | 5/2015 | Trottier | G06F 40/56 |
| | | | 707/755 |
| 2015/0188927 A1* | 7/2015 | Santhi | H04L 67/1002 |
| | | | 726/4 |
| 2016/0019636 A1* | 1/2016 | Adapalli | H04L 47/70 |
| | | | 705/26.62 |
| 2017/0078383 A1* | 3/2017 | Murstein | G06F 16/1873 |
| 2017/0315786 A1* | 11/2017 | Rogers | G06F 8/35 |
| 2017/0323089 A1* | 11/2017 | Duggal | G06F 21/126 |
| 2018/0081994 A1* | 3/2018 | Ron | G06F 8/34 |
| 2018/0150365 A1* | 5/2018 | Cors | G06F 11/2025 |
| 2018/0217999 A1* | 8/2018 | Kona | G06F 16/128 |
| 2018/0218025 A1* | 8/2018 | Rasmussen | G06Q 40/12 |
| 2018/0260400 A1* | 9/2018 | Vickers | G06F 16/2456 |
| 2019/0052549 A1* | 2/2019 | Duggal | G06Q 30/04 |

OTHER PUBLICATIONS

Lars Fredrik Edvardsen et al., Automatically Generating High Quality Metadata by Analyzing the Document Code of Common File Types, Jun. 2009, [Retrieved on Feb. 28, 2021], Retrieved from the internet: <URL: https://dl.acm.org/doi/pdf/10.1145/1555400.1555406> 10 Pages (29-38) (Year: 2009).*

* cited by examiner

SYSTEMS AND METHODS OF A METADATA ORCHESTRATOR AUGMENTING APPLICATION DEVELOPMENT

CROSS-REFERENCE TO RELATED APPLICATIONS

This application is a continuation of U.S. patent application Ser. No. 15/683,305, now U.S. Pat. No. 10,521,223, filed Aug. 22, 2017, and entitled "SYSTEMS AND METHODS OF A META DATA ORCHESTRATOR AUGMENTING APPLICATION DEVELOPMENT," which is incorporated herein by reference.

BACKGROUND

In many organizations, internal systems development efforts may be dispersed and fragmented, and it is often a case that typical application development efforts for improved computing systems will involve similar tasks, which will be performed anew in each development effort. While necessary to successful completion of overall projects as understood, repetition of simple tasks per development effort represent much mundane and time-consuming effort that is repeated on a per-project basis. Typical application configurations spend considerable time and effort on basic mapping tasks. Such effort is typically optimistically locked within an application for users of that application, but lacks ability to share, much less control, this effort across different application efforts. To this end, special machines and systems are created for various tasks and applications, and while each separately may be entirely functional on their own, at organizational levels, such development efforts leave room for improvement in regards to reusability and leverage of those efforts.

SUMMARY

The following presents a simplified summary in order to provide a basic understanding of some aspects of the innovation. This summary is not an extensive overview of the innovation. It is not intended to identify key/critical elements or to delineate the scope of the innovation. Its sole purpose is to present some concepts of the innovation in a simplified form as a prelude to the more detailed description that is presented later.

The innovation disclosed and claimed herein, in one aspect thereof, includes systems and methods that augment building and deploying of applications across an entity's development organization. For these considerations, as well as other considerations, in one or more embodiments, a system employs components of a database that stores data to be utilized by applications. For example, the system can include a metadata library component that holds details of configurations of data stores, metadata describing data in data stores, and rules concerning linkages of data store configuration details. The system can also include a metadata orchestrator that centralizes control of metadata library, generates documentation and provides automatic mapping from data structure to established data store links. Moreover, the system can include one or more adaptor components that leverage metadata library through metadata orchestrator so that adaptor functions are generated without a user writing additional code.

In another embodiment, a system for building and deploying applications may comprise a metadata orchestrator incorporating details of configurations of data stores, metadata describing data associated with potential data in data stores, and rules concerning linkages of data store configuration details that centralizes control of metadata, generates documentation and provides automatic mapping from data structure to established data store links. The system can also include one or more adaptor components that leverage metadata orchestrator such that application code for adaptor functions is generated thereby alleviating a user writing additional code. In aspects, the (or a subset of the) adaptor components interact with third party system components.

In another embodiment, a method for augmenting application development may comprise acts including: controlling metadata through a metadata orchestrator, querying the metadata orchestrator for presence of metadata related to an application item, and wherein if the query is negative, prompting a user to supply a pre-determined metadata input. The acts may also include, persisting the input into a metadata library, running a metadata orchestrator, which controls and interacts with the metadata library and, for application items, generating code, for example, java code, for a predetermined adaptor that enables the predetermined adaptor to perform functions associated with the application item. Further, the method discloses generating Application Programm[er/ing] Interface "(API)" documentation, generating source code for the service and functions associated with the application items, and deploying the adaptor with the provided code to a host environment associated with the adaptor. Embodiments to this method include optional paths of determining by querying a user whether a pre-determined item is desired to be customized, and handling the extensibility of the associated metadata under control of the metadata orchestrator according to pre-determined rules.

In another embodiment, a non-transitory computer-readable medium configured to store instructions, that when executed by a processor, perform operations including one or more of the system and method steps.

To accomplish the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
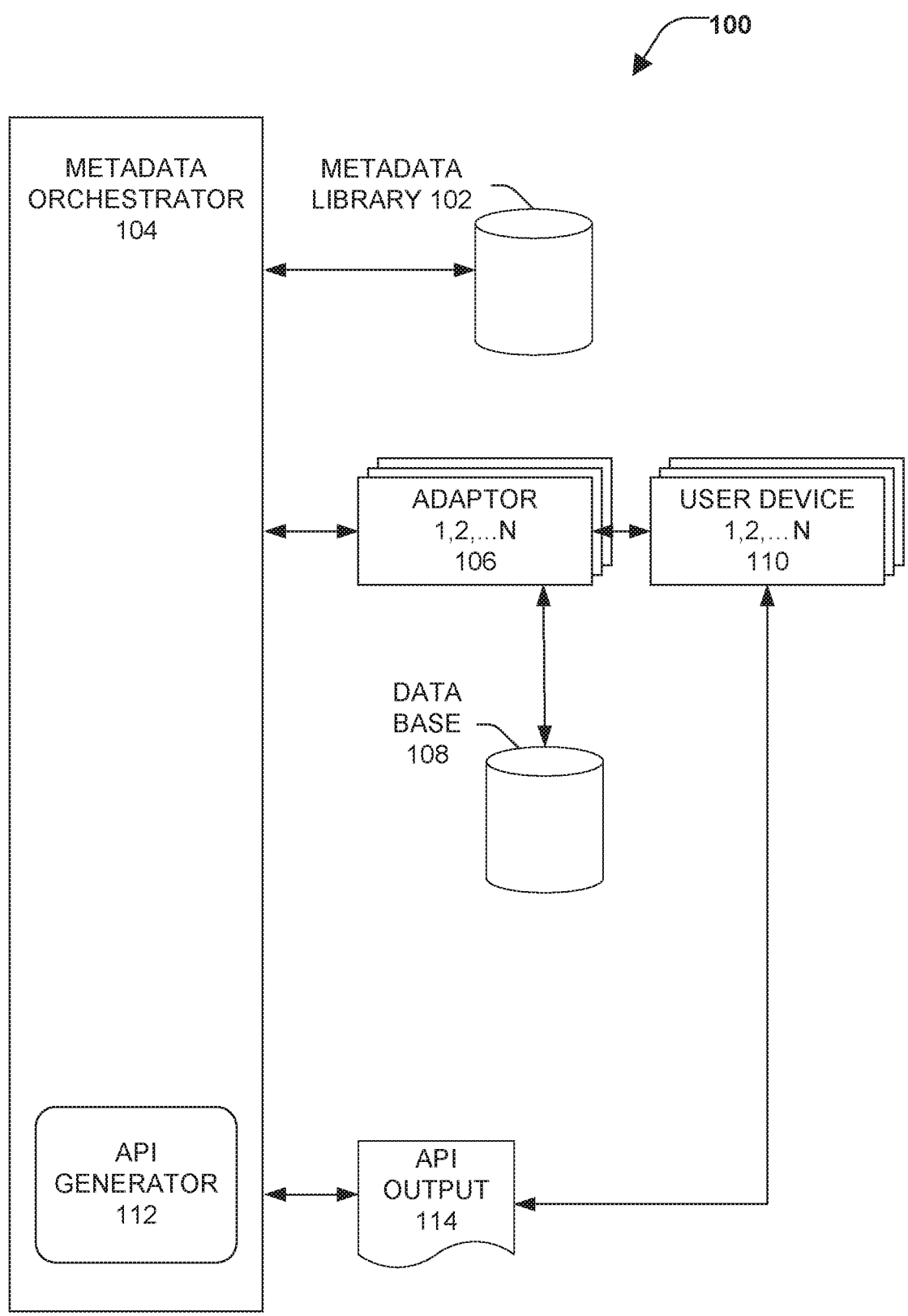
FIG. 1 is an illustration of a high-level example system with in accordance with one or more aspects of the disclosure.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details.

While specific characteristics are described herein, it is to be understood that the features, functions, and benefits of the innovation can employ characteristics that vary from those described herein. These alternatives are to be included within the scope of the innovation and claims appended hereto.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, the claimed subject matter can be implemented as a method, apparatus, or article of manufacture using programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. It is appreciated that embodiments are presented as a specific, non-limiting, examples of the innovation. Other embodiments are contemplated as well and intended to be included within the scope of this disclosure and claims appended hereto.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

With reference now to the figures, FIG. 1 is a high-level illustration of an example system 100. In system 100, a database or store of metadata, herein discussed as a metadata library 102 is configured to structure data models. The configurations are technology agnostic and are framework driven. Further, metadata library 102 may include configurations and metadata for data models, which may include models for data, models for business rules and models for processes. The metadata library 102 may include dynamic rules as well as baseline relationships between the metadata framework elements with baseline settings and settings, which may be defined as optional or extensible. It is to be appreciated that the nature of the metadata in the metadata library 102 is heterogeneous at a high level and is not specific to most any single technology.

As indicated, the metadata elements may be extensible. This allows for having base definitions as well as allowing flexibility and extending portions of the metadata elements for custom uses. The base portions provide fixed defaults. The combination provides both a pure standardized data definition, while also providing flexibility for customization. This metadata-driven approach allows for full customization of data definitions while maintaining the control of standard definitions.

The metadata library 102 interfaces with the metadata orchestrator 104, which may be viewed as a service layer above the layer of meanings that flow from configurations of specific technologies. Metadata orchestrator 104 removes most needs for individual application efforts to apply manual mapping of data characteristics and metadata to the configured state structures of data stores. As the metadata orchestrator 104 is a layer above the specific technologies, and provides centralized control to the metadata library 102, a centralized or common control of both data and metadata is enacted. The centralized control can extend across individual development and completed applications. The heterogeneity thus provided is at a high level and provides a reusability factor that is otherwise absent from individual development applications that merely enforce optimistic locking per application. It is to be appreciated that driving the structure and capturing the metadata (location and meaning) so that changes to interacting components, for example User Interfaces ("UI"), and for another example middleware layers, need not require to be manually mapped, updated, changed or linked. This savings occurs for each of various adaptor 1, 2, . . . N 106, and the individual adaptors as will be expanded and discussed in FIGS. 2 and 3. Likewise, the savings in mappings, updatings, changes and linkings, flow through each adaptor 1, 2, . . . N 106, to those items interacting with the various adaptors (for example, database 108 and user device 1, 2, . . . n 110), which shall be discussed in further detail in FIGS. 2 and 3.

Further, since the metadata information as present in metadata library 102 is technology agnostic, most any standard data storage product for database 108 can be utilized by the innovation. These and other alternatives appreciated by those skilled in the art are to be included within the spirit and/or scope of the innovation and claims appended hereto.

Metadata orchestrator 104 references metadata stored in metadata library 102 for various purposes. Metadata orchestrator 104 may provide code to generate an Application Programm[er/ing] Interface "(API)", or to retrieve and store metadata to adaptors so the adaptors may work together in a consistent manner. Metadata orchestrator 104 can be called using various technologies, including, but not limited to, Simple Object Access Protocol (XML protocol) ""SOAP") and JavaScript Object Notation "JSON"/restful messaging or the like. Metadata orchestrator 104 may also comprise a module API Generator 112 that dynamically generates metadata documentation (API output 114) to be accessed, for example, in a web-browser, or mobile device, or and as well as, in Portable Document Format (Adobe Acrobat) ("PDF") format.

It is to be appreciated that adaptor 1, 2, . . . N 106 may be geared to a number of distinct end item and program application functionalities. It is also to be appreciated that the metadata orchestrator 104 is technology agnostic, and that as new technologies emerge, suitable mating adaptors may be created that bridge to the controls of the metadata orchestrator, thus providing a degree of technology agnosticism and robustness mostly unlimited by technology evolution. With the core data and metadata controls in place in metadata orchestrator 104, the advance of new technologies may be more readily implemented and change control may remain centralized at a metadata level with metadata orchestrator 104.

In an embodiment, metadata orchestrator 104 may comprise a module API generator 112. As pictured, API generator 112 is contained within metadata orchestrator 104, and it should be appreciated that in other embodiments, API generator 112 may be a standalone component interacting with metadata orchestrator 104. API generator 112 automatically generates documentation of the metadata orchestrator 104 information as may be contained in metadata library 102, as well as information supplemented to various adaptor interactions. Since metadata orchestrator 104 defines aspects of handling data storage, viewing and usage, API generator 112 captures these interactions and generates readable documentation regarding the use of the API's and the data definitions and self-documents most all API's and data usage.

It is to be appreciated that the API generator 112 may output this documentation in a number of ways (labeled as API output 114), from direct screen information displayed to various user devices 1, 2, . . . N 110, to captured PDF files that may also be displayed, messaged, or stored for later use. Also, it is to be appreciated that the contents of the API output 114 may range from strictly technical API data, snapshots of data definitions available to users for quality control efforts, to a mere end user help documentation write ups, and that these different modes may occur together or separately.

It is to be appreciated that the range of adaptors 1, 2, . . . N 106 and the interaction of adaptors with other components involved in application development within an organization are not limited in the innovation. A particular adaptor in the group adaptors 1, 2, . . . N 106 may be dedicated to a specific functionality, or may incorporate several functionalities. In non-limiting embodiments, adaptors may be indicated as to be segregated for special purposes, details of which will be discussed in relation to FIGS. 2 and 3.

It is to be appreciated that with centralized metadata orchestrator 104, the metadata related to various objects used in application development will coalesce around common design patterns. Having a common way to access data, as well as, having the metadata-driven features centrally controlled by metadata orchestrator 104 allows, based on metadata, users to re-use modules that interface with the various adaptors and other application components more easily. In cases wherein APIs and usage may be common, the underlying code that directs interaction with items may be common as well. Metadata orchestrator 104 enables the common lower level code to be automatically generated, and since the code is controlled, users no longer have to engage in the mundane item-to-item mapping as would be necessary in prior application development wherein optimistic locking may typically occur in siloes within each application development, as opposed to across applications. In fact, metadata orchestrator 104 is optimally located outside of most any application silo and deployed separately from other applications because of its centralizing control across applications. In this sense, it is agnostic to applications being developed and forms a stronger backbone that can unite and simplify actions typically un-leveraged in each of many disparate applications.

Metadata orchestrator 104 employs optimistic locking across applications; in contrast to the usual application of optimistic locking that occurs within siloes of individual application developments. Metadata orchestrator 104 elevates the level of optimistic locking to a service layer above most any of the individual application development projects, thereby saving hundreds of hours of development time, and ensuring common design patterns across individual application development projects. Users, instead of focusing on items such as (prior required) mundane and expensive mapping, can now spend their time and energy on more substantive creativity.

Figure 2:
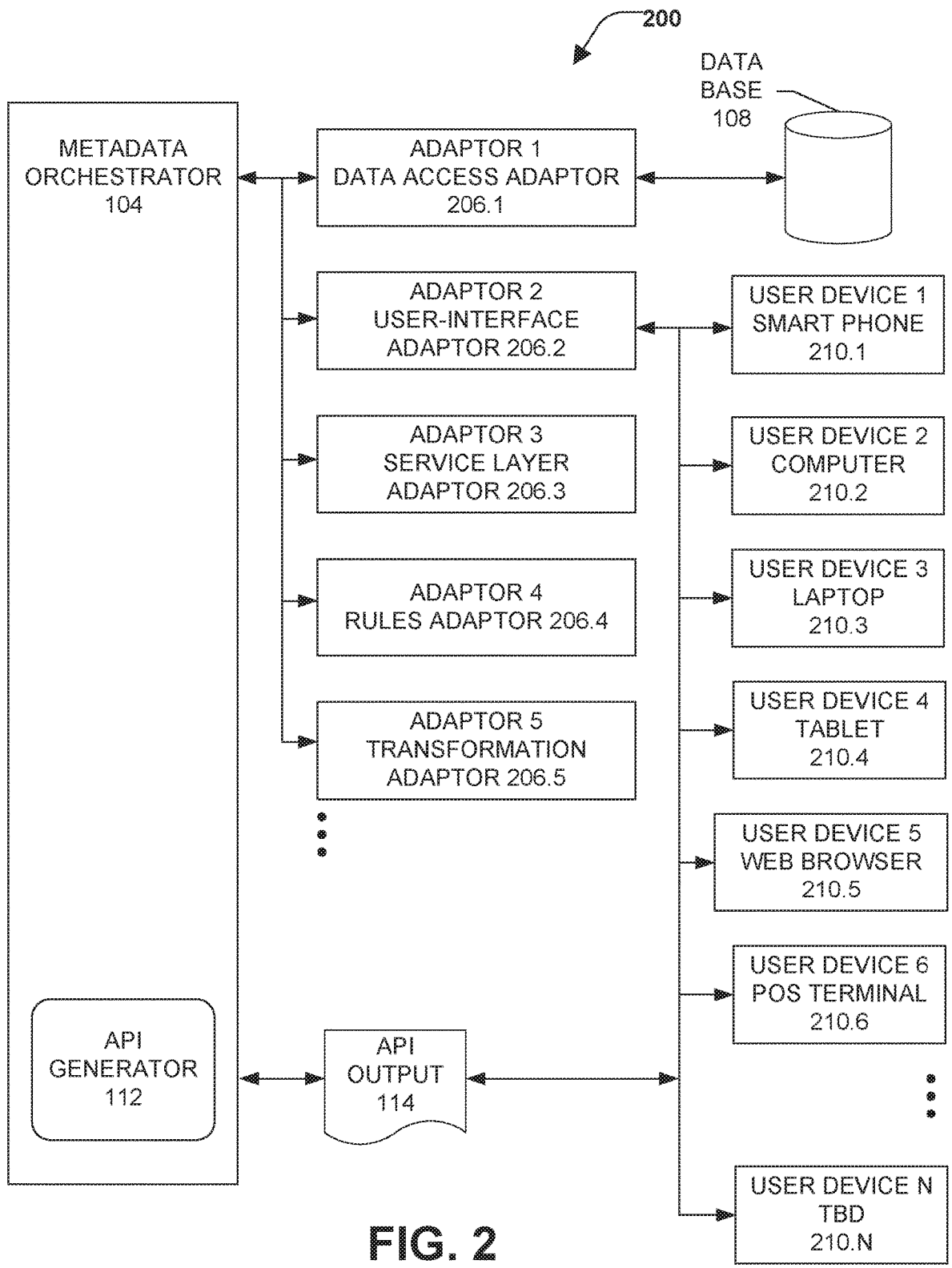
FIG. 2 is an illustration of example system components, according to one or more embodiments.

Turning now to FIG. 2, illustrated are example system components, according to one or more embodiments 200. In an embodiment, the metadata library 102 (not shown) may be accessed and controlled by the metadata orchestrator 104. In FIG. 2 the adaptor 1, 2, . . . N 206.N group has been expanded, as well as user device 1, 2, . . . N 210.N group has also been expanded. It is to be appreciated that since controls reside in the metadata orchestrator 104, adaptor and user devices are not limited by the innovation, and future new items in each group of adaptors and user devices may just as easily be modified to interact with the innovation. Since it is the metadata orchestrator 104 that drives the structure and capturing of metadata details (for example, location/meaning), it is to be understood that the changes to User Interfaces ("UI") and other middle layers (as may be processed by various adaptors) will have the functionality of manually mapping, updating, changing, and linking already mostly obviated by the innovation. The metadata orchestrator 104 remains the common point for each of the various types of adaptors. As an adaptor is being used in, for example widget creations, the common metadata through metadata orchestrator 104 leverages dynamic capabilities, connecting not only to adaptor 1 data access adaptor 206.1, but through most any of the other possible various adaptors and/or components.

Further, this driving of the structure and capturing metadata elements (for example, location/meaning) carries with it the ability to alleviate a need for users to change UI and middle layers elements; specifically changes such as manually mapping, updating, changing, or linking. Metadata orchestrator 104, as a common point for each of the various types of adaptors, handles control of these actions. This means that when an adaptor is being used in widget creations, common metadata through metadata orchestrator 104 connecting to various components leverages many dynamic capabilities as disclosed herein.

As noted, it is to be appreciated that, in aspects, certain adaptors may be tied to specific system elements in the overall operation of the system. For example, adaptor 1 data access adaptor 206.1 is tied to database 108 and adaptor 2 user interface adaptor 206.2, is tied to a host of potential user devices 1, 2, . . . N 210. These system elements show interactions and the power of metadata orchestrator 104 to access and control data from database 108 and in some embodiments, metadata library 102 through the adaptor 1 data access adaptor 206.1. It is to be appreciated that database 108 may also contain more than mere data, but contained stored functions, business rules, and other application components).

Database 108 is pictured separated from the metadata library database 102, but in some embodiments, the two databases (or stores) may be of a single database configuration. Additionally, some aspects can include unstructured data as appropriate. Adaptor 1 data access adaptor 206.1 may be mainly concerned with functions and data calls (including metadata) that relate to data access functions tied to data in database 108, or metadata library 102. Adaptor 1 data access adaptor 206.1 may access the data directly using the defined metadata. With defined metadata, adaptor 1 data access adaptor 206.1 may interact with metadata orchestrator 104, which may generate code and logic necessary to perform read/update/insert/delete of most all data elements regardless of the database model locations, and code may be generated without action from the user. By way of example and not limitation, third party example adaptors of Adaptor 1 data access adaptor 206.1 may include Hibernate, JPA Annotations, Spring Data, Native Data Access Objects ("DAO"), and Sprint Java Data base Connectivity ("JDBC") or the like. It is to be appreciated that with adaptor 1 data access adaptor 206.1, as with other adaptors, the centralized metadata controlled by metadata orchestrator 104 leads to data and information reusability. Many hours of effort may be eliminated by leveraging the metadata structures that enable reusing the underlying data and processes efficiently to develop new interfaces that share some commonality.

It is to be appreciated that centralized metadata data control through metadata orchestrator 104 yields quicker and more reliable impact analysis. Since the metadata-driven approach ensures centralized processing of data, it is much quicker and more reliable to determine impacts to data changes in location, application, usage and logic through metadata orchestrator 104.

API output 114 (as generated by API generator 112) is shown as being output from the metadata orchestrator 104, and being connected to most any of user device 1, 2, ... N 106. It is to be appreciated that the API output 114 may take most any number of forms from screen presentations to PDF data files (among others), and would be available through adaptor 2 user-interface adaptor 206.2 for a number of uses.

Figure 3:
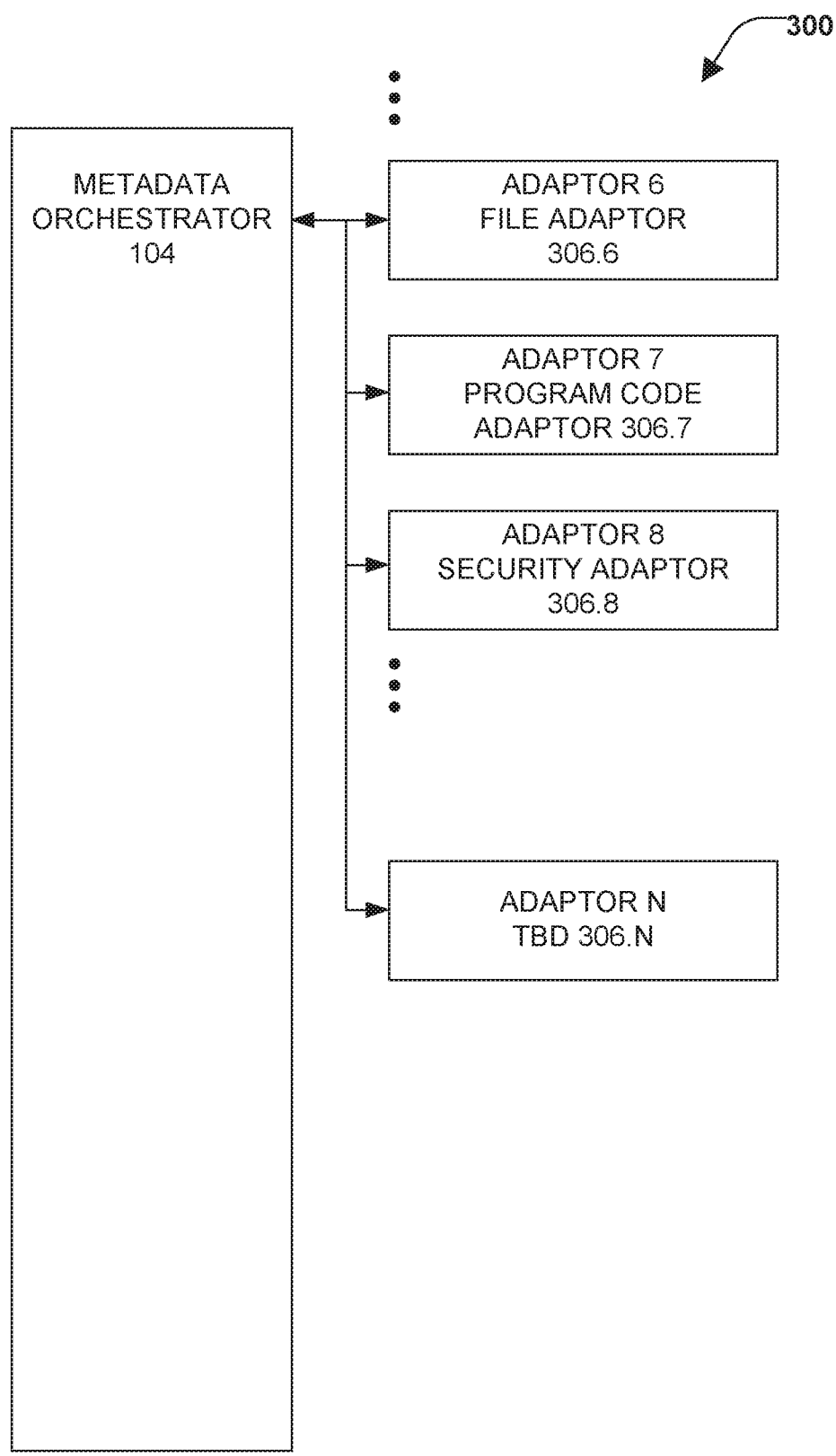
FIG. 3 is an illustration of example system components, according to one or more embodiments.

FIGS. 2 and 3 illustrate an open-ended group of additional adaptors, from adaptor 3 service layer adaptor 206.3, adaptor 4 rules adaptor 206.4, adaptor 5 transformation adaptor 206.5 to adaptor 6 file adaptor 306.6, adaptor 7 program code adaptor 306.7, adaptor 8 security adaptor 306.8. to most any number of future adaptors as represented by adaptor N TBD 306.N.

Likewise, it should be appreciated that adaptor 2 user-interface adaptor 206.2 may connect to an open-ended host of user devices and that future technology and future user devices will not constrain the innovation. Changes in the adaptor side may leverage the existing metadata orchestrator 104 side.

Another aspect of the innovation is that a centralized metadata orchestrator 104 provides increased capability to ensure data integrity. Data integrity is more easily assured by providing centralized metadata orchestrator 104 and metadata library 102 that controls data integrity rules and processes. One of the primary reasons for data integrity to become compromised is a de-centralized approach to data use and data updates. When various disparate applications across an entity each attempt to impact data, and may apply different logic rules for tracking data, data integrity rules may easily become out of synch. Instead, with metadata orchestrator 104, the metadata centralized approach ensures consistency in data updates and integrity. Redundancy may also be an issue when performing data updates using logic located in different places. It is to be appreciated that with metadata orchestrator 104, a metadata-driven centralized approach can alleviate that issue.

Turning to Adaptor 2, user-interface adaptor 206.2, this adaptor may use metadata to render user-interfaces ("UI") to one or more user devices in group as shown by User Device 1, 2, ... N 110. Adaptor 2 user-interface adaptor 206.2 may utilize the detailed and heterogeneous metadata supplied to and from metadata orchestrator 104 for metadata orchestrator 104 to generate code to produce create/read/update and delete data functionalities. This adaptor may interact with metadata orchestrator 104 resulting in rendering of the data on a variety of devices, e.g., without program code being needed to be written by the user. This capability provides for rapid application development. The metadata orchestrator 104 quickly allows APIs to be defined and used early in development projects, and alleviates a need to spend time 'stubbing' mock interfaces or to develop preliminary mock-ups that would eventually be discarded. Reusability in these types of efforts may provide extensive time and effort savings while facilitating error control.

In an embodiment, metadata orchestrator 104 may provide code to create metadata-driven user-interface templates to dynamically render content and allow read/update capabilities based on the user security settings as developed to render in major web browsers. This allows a developer to re-use a template and provide a customized view without the user making most any changes to the UI code. This embodiment can be applied to most any device, including mobile devices, and once captured in the metadata library 102, may be leveraged and be accessible across different application development efforts through metadata orchestrator 104.

The power of the metadata orchestrator 104 and metadata library 102 also may generate and execute test scripts automatically, based on the metadata of the items being used by developers. Since the heterogeneous metadata captures the descriptions of data access and methods used, testing scripts can be automatically created to test the APIs in many different ways. For example, thousands of test cases can automatically be generated and evaluated in minutes, potentially saving costs associated with hundreds of hours that might otherwise be spent manually creating the test cases. Further, such manual creations may require constant modifications on an application by application effort.

An example embodiment may provide an illustration of the leverage that may be obtained from the innovation. For example, adaptor 1 data access adaptor 206.1, and adaptor 2 user-interface adaptor 206.2, may provide the insight into how dynamically created code behind the screens displayed to users may be obtained with using the metadata to define the implemented functions.

Example metadata describing a Fulfillment Site AU field:
"Name": "FulfillmentSiteAU",
  "FullName": "MortgageAgreement.FulfillmentSiteAU",
    "Description": "Fulfillment Site AU",
    "Type": "String",
    "Order": "00220",
    "DatabaseColumnName": "FLFMT_AU_CD",
    "DefaultValueOnInsert": null,
    "AncillaryIanformationList": [
      {
        "Name": "hidden",
        "Type": "attr",
        "Value": "N"
      },
      {
        "Name": "globalUpdate",
        "Type": "attr",
        "Value": "Y"
      },

```
    {
        "Name": "bulkUpdate",
        "Type": "attr",
        "Value": "Y"
    },
    {
        "Name": "group",
        "Type": "attr",
        "Value": "Loan Details—General Information"
    },
    {
        "Name": "uiType",
        "Type": "attr",
        "Value": "Text"
    },
    {
        "Name": "maxLength",
        "Type": "attr",
        "Value": "7"
    },
    {
        "Name": "BusinessDescription",
        "Type": "attr",
        "Value": "The AU where the application was
            Processed and Underwritten"
    },
    {
        "Name": "display",
        "Type": "attr",
        "Value": "Fulfillment Site AU"
    }
],
"Writable": true,
"Autogenerated": false,
"Reference": false,
"Nullable": true,
"Identifier": false
```

Without such metadata controlled by the metadata orchestrator 104 using an adaptor 2 user-interface adaptor 206.2 (as augmented from metadata library 102), a UI developer would typically need to manually map and manually track information. Not so with metadata orchestrator 104, as the component would automatically insert into UI code with the returned metadata from metadata orchestrator 104.

Continuing with the example, the returned metadata would look like:

```
<div class="form-group form-group-sm has-feedback">
    <label class="col-xs-12 col-md-3 control-label"
        for="fulfillment_site_input">Fulfillment Site AU</label>
    <div class="col-xs-12 col-md-7" data-errortooltip="Fulfillment Site
AU invalid.">
        <input name="FulfillmentSiteAU"
            class="form-control"
            id="fulfillment_site_input"
            type="text"
            size="7"
            maxlength="7"
            data-sec-mode="edit"
            data-fv-field="FulfillmentSiteAU">
    </div>
</div>
```

With such control by metadata orchestrator 104, the automatically supplied UI code (for example in UI script such as JavaScript, Java Standard Template Library ("JSTL"), Java Server Pages ("JSP"), or the like), may dynamically generate the user interface either directly using metadata fields or derived values based off of the fields.

It is to be appreciated that the innovation, in eliminating manual steps associated with typical mappings and in providing control through metadata orchestrator 104, prevents user error points from occurring and ensures data integrity. Metadata orchestrator 104 alleviates data contention by centralizing the implementation and control of an optimistic locking pattern, not within single applications, but instead across an entity, ensuring consistency among most all applications. Metadata orchestrator 104 provides centralized control of the data definitions and functionality via the metadata implementation and single point control in metadata library 102. Most all entity applications existing and in development are funneled through the metadata control reducing or mostly eliminating redundancy. Applications integrate centralized metadata definitions of data elements. Reliance on unsure mapping documents and human interpretation and implementation is mostly eliminated, and first user actions are maximally leveraged. The data structure of metadata library 102 also provides additional flexibility and enables rapid development by allowing the definition of functions via metadata and generation of code by metadata orchestrator 104, alleviating the time consuming and rote manual mapping. Adaptor 2 user-interface adaptor 206.2 may leverage metadata orchestrator 104's returned metadata which dynamically generates code for the user interface, dynamically generates unit test modules for functions, dynamically generates API documentation (resulting in faster test cycles), and reduces defect counts based on the elimination of human coding errors.

It is to be appreciated that the Adaptor 2 user-interface adaptor 206.2 interfaces with group User Devices 1, 2, . . . N 110 and that the user devices within that group are agnostic to the metadata orchestrator 104. The calls for metadata back and forth between various user devices, including future user devices, all still relay metadata as related to the data being passed back and forth, and since metadata orchestrator 104 controls the metadata, the metadata is defined independent of end technology. Thus, it is to be appreciated that metadata orchestrator 104 is technology agnostic. The metadata-driven approach of the innovation is not technology dependent. The information in the metadata is focused on the standard practices as controlled by metadata orchestrator 104 through metadata library 102 for viewing, defining, reading, updating, adding and deleting data across various layers of an application using a variety of technologies, and it is to be appreciated that the heterogeneous nature makes it "future-proof" as the system of metadata orchestrator 104 is readily usable for emerging technologies. Thus, there is a degree of "future proofing" that the system enjoys. Metadata orchestrator 104 operates at such a heterogeneous level and is technology agnostic, so that the data and metadata controls can absorb technological changes without impacting the host of other applications that also interact with the data and the metadata controls. By dissociating most any direct link and truly being technology agnostic, future and new technologies fold into the control system and the continued leveraging based on metadata structures ensures "future-proof" development efforts alleviate the need to manually go back and recalibrate entire systems and data definitions. This ensures the maximum reusability, elimination of manual mapping and the host of benefits such as quicker test cycles and lower human error rates.

Turning to adaptor 3 service layer adaptor 206.3, this adaptor may receive transactions from various client types (includes, but not limited to): User-Interface (web browser, mobile device, etc.), External Application/Web Service, and Server process. The adaptor 3 service layer adaptor 206.03 can accept various message types and can transform the message to create metadata-driven standard data structures to be used by other adaptors (for example, with sample message types such as SOAP, JSON, Hypertext Transfer Protocol ("HTTP/S"), etc.). It is to be appreciated that the synergy available from one adaptor to one or more other adaptors is a natural result of choosing to make the metadata orchestrator 104 the controlling entity. In this manner, each adaptor may be developed and used without regard to data incongruity.

Example implementations of adaptor 3 service layer adaptor 206.3 include metadata orchestrator 104 generating code for adaptor 3 service layer adaptor 206.3 interfacing with Web browser based interfaces, server nightly batch process interfaces, SOAP Web-service interfaces, and Java Message Service ("JMS") Queue interfaces.

Adaptor 4 rules adaptor 206.4 may be used to run business logic rules to centralize data edits and processing. Adaptor 4 rules adaptor 206.4 may link with the metadata library database 102, as well as may link with Adaptor 1 data access adaptor 206.1 and that adaptor's link to database 108. By working with metadata orchestrator 104 metadata control, adaptors yield the most robust data edits and processing. Adaptor 3 service layer adaptor 206.3 may receive a transaction in various formats, and by interacting with metadata orchestrator 104, metadata orchestrator 104 may convert the information into a common metadata structure. The adaptor 4 rules adaptor 206.04 may then use this common structure to execute rules to provide centralized edits and business logic. The results of the rules are in a common object that can be passed to the other components, and each of these may be reflected in an updated metadata library 102. This common approach enables reusability of common rules, as centrally controlled by metadata orchestrator 104. It is to be appreciated that in some embodiments, adaptor 4 rules adaptor 206.4 may be incorporated into metadata library 102 or metadata orchestrator 104. In other embodiments, adaptor 4 rules adaptor 206.4 may be a standalone component. In an embodiment, "Drools" rules may be used in this adaptor.

Adaptor 5 transformation adaptor 206.5 may utilize the metadata orchestrator 104 to structure and transform data into many different structures. These custom structures may be used to send messages to other services, and generate SOAP messages, for example. An embodiment may use Thymeleaf to generate SOAP messages. Adaptor 5 transformation adaptor 206.5 may in this manner, expand the usefulness of the metadata orchestrator 104 metadata control to translate back and forth the metadata into forms that integrate with other services. While the central control of the metadata orchestrator 104 remains for applications within the entity, most any different data structure environments outside of the entity may be enabled with the transformations of adaptor 5 transformation adaptor 206.5.

Turning now to FIG. 3, illustrated are further example system components according to one or more embodiments 300, specifically additional adaptor components that are integrated with the metadata orchestrator 104. It is to be appreciated that the continued adaptors presented in embodiments 300 may also be present in other embodiments, such as for example embodiment 100 and embodiment 200.

Adaptor 6 file adaptor 306.6 may also extend the benefits of metadata orchestrator 104 by utilizing the metadata orchestrator 104 metadata structure control to transform data into many different file formats. Such a file adaptor would then enable further customizing of data structures as may be present in metadata library 102, and may use metadata orchestrator 104's code generation for read/parse, as well as, generate files and reports based on metadata that has been identified with custom structures of third party applications. For example adaptor 6 file adaptor 306.6 may provide an interface so that Apache-PURL-Based Object Identifier ("POI") input will be recognized by metadata orchestrator 104 (and metadata library 102), and code generation may be performed by metadata orchestrator 104, for example for spreadsheet (e.g., Excel) files.

Adaptor 7 program code adaptor 306.7 may interact with and operate under the control of metadata orchestrator 104 to utilize the common metadata structure and execute custom logic written in various programming languages. This adaptor may be used when the other adaptors are not adequate to complete a solution, for example, in situations in which the application development is largely based on third party software, as may be the case with Java.

It is to be further appreciated that even security concerns may be alleviated with the use of a system with metadata orchestrator 104, as each of the system items are controlled thought the central metadata control point. Most all typical manual mapping and adjustments that may otherwise need to be painstakingly checked and verified also are alleviated with the present innovation. To this end, adaptor 8 security adaptor 306.8 may utilize various authentication and authorization mechanisms to control data access down to a field level. Many different security mechanisms can be used in this layer, for example, Lightweight Directory Access Protocol ("LDAP"). It is to be appreciated that most any of the adaptor components may be integrated into metadata orchestrator 104 directly, or may be associated with metadata orchestrator 104 and be in communicative connections such that metadata orchestrator 104 may access and control the various adaptors as may be required to provide for centralized data security. Data security is more important than ever. Metadata orchestrator 104's created centralized mechanism to allow access to read/update/insert/delete data on a field level thus may provide benefits for an entity with far flung application development efforts that separately may present multiple security concerns. Rather than tracking down each development effort and employing manual oversight to ensure that security measures are properly initiated, maintained and updated, the ability to tie most all such measures to the centralized metadata orchestrator 104 based on the highly heterogeneous metadata control would alleviate time and effort from each of the development teams.

Centralized logging of the data access also ensures data is available to research and control. By providing a centralized mechanism for the data access, the data security is standardized and can be change more quickly to ensure only persons with a business reason to read/update data are permitted. Otherwise, each software application/product would require independent data access controls which may be much more difficult to coordinate, control, and update as appropriate.

Further, the open ended nature of providing adaptors that may interface with and be controlled by metadata orchestrator 104 provides a "future-proof" aspect to the application development activities of the entity, provides confidence that the centralized controls will allow a more concentrated focus by application developers on the substance of improvements as opposed to the more mundane (but no less important) manual mapping activities that may exist siloed within each application development effort. Since the metadata is heterogeneous and can be used in many different implementations, most any adaptor created and based on interfacing with metadata orchestrator 104 may use the standardized information that is contained in common re-usable/self-documenting data structure system.

While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Figure 4:
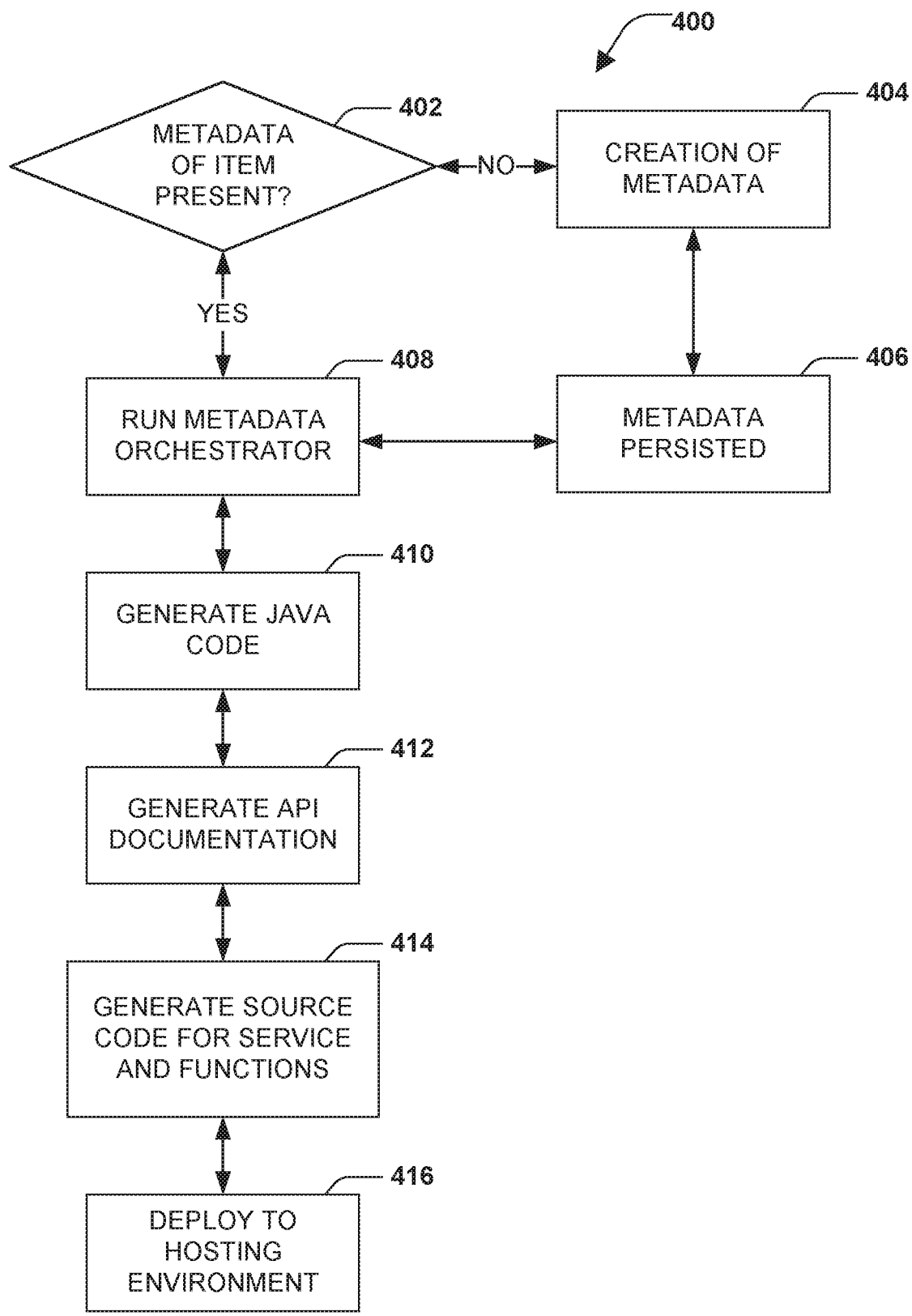
FIG. 4 is an embodiment of a method 400 of application development using a metadata orchestrator system, according to one or more embodiments.

Turning to FIG. 4, on embodiment of a method 400 of application development using a metadata orchestrator system (such as system 100 as shown in FIG. 1), can begin at 402 with a user decision to add a new field to an application. At 402, the item is checked to see if the item is already present in the metadata orchestrator system, for example, in metadata library 102. A negative search result flows to step 404, in which the user might add the field to the database, populating the metadata data structure. It is to be appreciated that this population effort may entail a number of information being received from the user and may be guided by business rules present in metadata library 102. At step 406, the update of the metadata library 102 with the metadata and the new configuration is persisted. The updated metadata is integrated and available to metadata orchestrator 104 and metadata orchestrator 104 would be run at step 408. It should be appreciated that if all items are already present, the result of step 402 would move directly to step 408. Without most any additional coding performed by the user, driven by the metadata, metadata orchestrator 104 at step 410 generates java code related to the item(s) being processed. Along with this code generations, at step 412 metadata orchestrator 104 also generates API documentation (through for example API generator 112, as shown in FIG. 1). It is to be appreciated that the documentation generation may follow the system already described in system 100 of FIG. 1.

In other words, the desired update is checked for existing presence in the metadata library, and if not present, system prompted and user supplied metadata configuration details are obtained, and then the metadata orchestrator (metadata orchestrator 104 for example) leverages the identified metadata to dynamically provide code to the UI and presents data properly, with no specific widget code written by the user. Additionally API documentation is automatically provided, and that documentation either may be the technical details or may be information along the lines of user help documentation (or both). The documentation may further be outputted in a number of ways, from being captured in PDF format, to being displayed on a user device.

Depending on the adaptor, step 414 may dynamically provide for the UI edits, update security, and piping from the backend. It is to be appreciated that the actions of metadata orchestrator 104 are agnostic to the backend of the system, At 416 the solution is deployed to the hosting environment, typically through the various connected adaptors Adaptors 1, 2, . . . N 106, for example.

Metadata orchestrator 104 handles the editing and piping based on the metadata and the metadata library 102. Metadata orchestrator 104 will output through the adaptor interfaces with various backend components, and will also auto generate the documentation through API generator 112, for example.

In another embodiment, items captured in metadata library 102 can be effectively propagated through metadata orchestrator 104 across a number of disparate applications, thereby leveraging a change or update once completed in one application. Since the change is centrally referenced in the metadata describing the data, most any application using the data through the central control of metadata orchestrator 104 will update through the metadata interaction and leverage the data and the code for using the data across most all applications.

For example, applications may consume certain data while not consuming other data, for example in database 108. Since the metadata orchestrator 104 message design is de-coupled from the database design (of database 108), some changes (new fields added) may be made to metadata library 102 and reflected in metadata orchestrator 104 and would flow through most any consuming application that attempts to use data with calls of metadata though metadata orchestrator 104. Other applications interacting with metadata orchestrator 104 and not requiring calls for such data (or other items in the metadata library 102) would be completely abstracted from the affected data, thus not requiring the updates. As such, applications may be updated when the metadata indicates consumption of the particular data that may have been updated elsewhere, and applications will be unaffected by changes to data (and metadata) not consumed by the application. Thus, metadata orchestrator 104 would account for altered tables of the data based on the metadata controlled for the particular data desired to be modified. For example, a adding a new field to the data would, in a target state environment, and for most any consuming application that interacts with the metadata associated with the consumed data, have changes to the metadata definition effected by the metadata orchestrator 104 that would regenerate function code being deployed.

In an embodiment for which a new field may be requested to be added to an existing function, a first user will add a metadata entry describing the field (for example, at previous step 404 of FIG. 4. The first user may assign this element to the desired function(s). A user may version the change as a minor version (if it is desired for the feature to be an extensible item), regenerate metadata orchestrator 104 and test. Most any further use of the data—across other applications, application development efforts and even across technologies—may deploy and leverage the change as a new consuming application will use the latest version of the function to access the data, since the controlled aspect runs through the central metadata orchestrator 104. Some applications may not be concerned with the new fields, and such will have no impact, as the metadata, albeit present, simply will not have an interaction.

In other embodiments, an option to not update to a new version may be presented. In such a case, the data that is provided will be provided with the controlling metadata as provided by the metadata orchestrator 104 and the metadata may include a version tag or similar metadata indicator distinguishing between a core value and an optional extensible item as the metadata would control.

In most all cases, since the metadata as controlled by the metadata orchestrator 104, the driver for the various adaptors through which data may be being pulled through, dynamic UI implementation will be automatic, and the new field will render correctly on the implementing screen with no changes or need for extra user code to be written on the part of the subsequent users across the common data access entity.

In an example embodiment, an example of an application effort to reorganize a database table is presented. In such a case, there may be a requirement to alter table structures for technical reasons. A first user may alter the existing metadata entries to coincide with a new table structures. As the structure of the data is de-coupled from the data of the messages, the function of the messaging will need not to be altered, and no function versioning is necessary. In addition, since changes are implemented along with database changes, no consuming application changes are required. It is to be appreciated that the consuming application changes may be application changes subsequent in the same development project, other development projects, or other applications already developed and that calls on the data and or functions associated with the database table pass through the control of metadata orchestrator 104.

In another example embodiment, a development task of rapidly develop a Web-based application from scratch to search, select, view and update any row in any of the 120 existing Oracle database tables was undertaken and the results presented herein.

At 402, an initial user interacted with the metadata orchestrator 104, which checked the metadata library 102 for presence of items within the system. For those items not in the metadata library 102, the method moved to 404, in which generation of metadata structure occurred. At 404, information was gathered from the user sufficient to establish the metadata record. At 406, the gathered metadata was persisted into the system, updating the metadata library 102, and the metadata orchestrator 104 was run at 408. Using metadata orchestrator 104 in conjunction with adaptor 1 data access adaptor 206.1 and database 108, the obtained data, as dictated by the metadata spanned a reach into database 108 across 120 different data tables. With adaptor 2 user-interface adaptor 206.2 and adaptor 3 service layer adaptor 206.3 (of which the user was not aware of), the system rendered data (on auto-generated code, based on the metadata) as represented by step 410 (in which java code was generated). Also, at 412, the automatic generation of API documentation was undertaken, and (not shown) this documentation was both rendered to a user device and captured in a pdf format.

At 414 generated source code for service and functions was completed by the metadata orchestrator 104 and though adaptor 2 user-interface adaptor 206.2 and adaptor 7 program code adaptor 306.7, three template components providing functionalities of "view and update data", "search data" and "list entries" (for navigation) were completed without development of custom or UI java code by the user; and at 416 the components were deployed to a hosting environment, with metadata orchestrator 104 and adaptor 2 user-interface adaptor 206.2 rendering each component on the pre-determined host environment. It is to be appreciated that API generator 112 and metadata orchestrator 104 provided base testing starting at 412, enabling the user to review and correct any defects in the constructed components at the deploying step at 416.

In this undertaken example, without the ability to leverage metadata orchestrator 104, and without the ability to re-use any existing metadata structures, or to use the code generating aspects tied to building components, as well as to use the API output for test purposes, a typical user would have been required to manually develop over 200 java objects, over 125 UI screens and manually code over 200 field level edits at an estimated time of 400 man-hours (and that does not even include any time for subsequent documentation at either the internal team technical level or at an end-user help level).

The use of metadata orchestrator 104 and the system allowed the user in this case to complete and debug the entire application within 28 man-hours, including the automatic documentation of the solution. A 93% improvement obtained with the innovation in comparison to the disparate conventional processes that would have had to have been engaged.

It is to be appreciated that much of the metadata orchestrator 104 generated actions may result in simply reusing items already created by unrelated application developments and referenced in the metadata library and database, by merely designating the item through its metadata.

Figure 5:
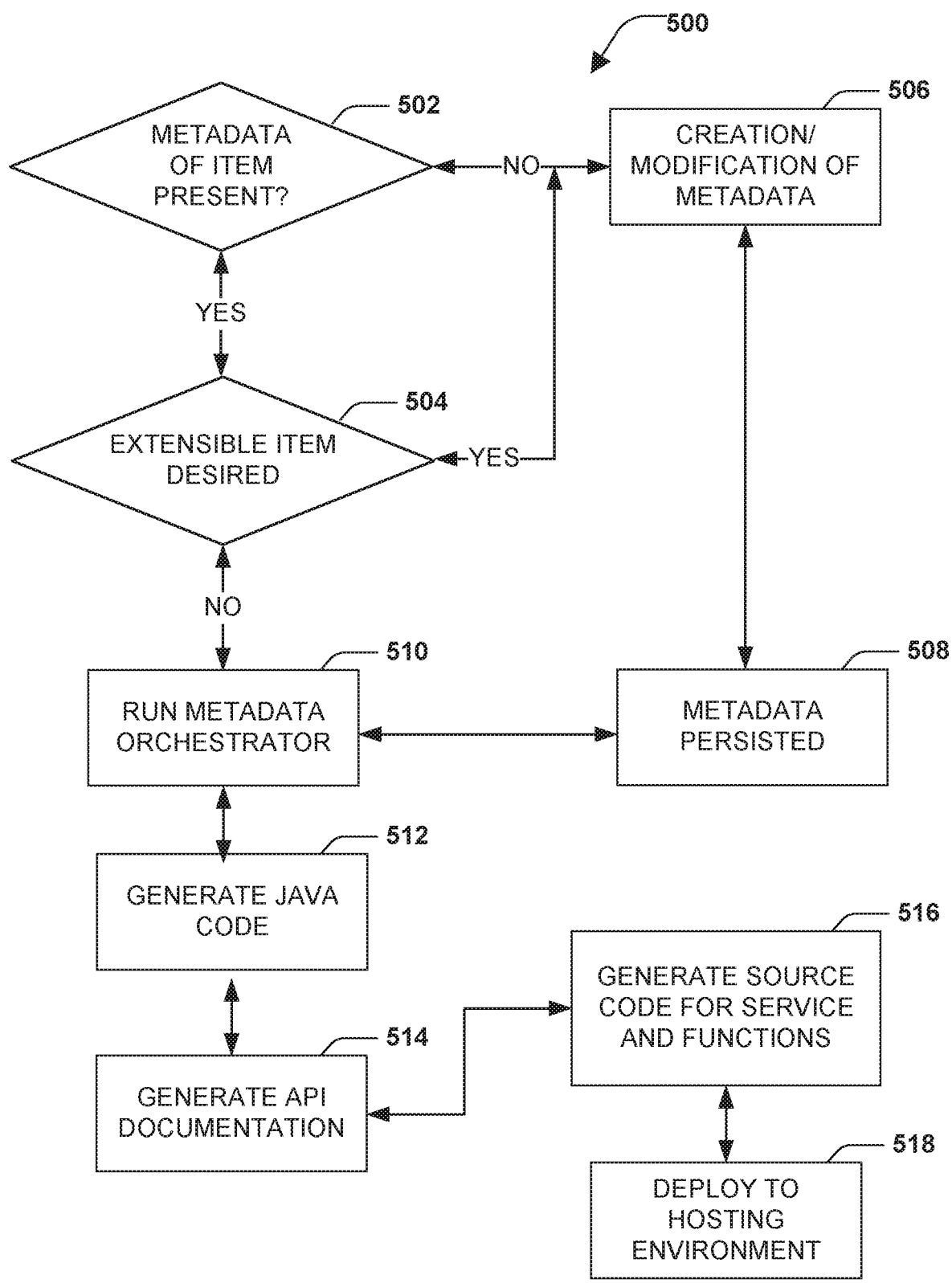
FIG. 5 is an embodiment of a method 400 of application development using a metadata orchestrator system, according to one or more embodiments.

In FIG. 5, in another example embodiment of a method 500 of application development using a metadata orchestrator system (such as system 100 as shown in FIG. 1), can begin at 502 with a user decision to add a new field to an application. In this method, an additional question of the user at 504 provides for the optionality of using extensible terms. That is, terms that may be in the system already, but for which extensions, modifications, or alternative aspects may be desired to be customized. It is to be appreciated that which terms may be extensible and which terms may not be extensible may vary from system to system and may be controlled by business rules as present in metadata library 102.

A negative search result of the decision point at 502 flows to step 506, in which the user might add the field to the database, populating the metadata data structure. It is to be appreciated that this population effort may entail a number of information being received from the user and may be guided by business rules present in metadata library 102. Likewise, a positive result from the decision point at 504 would also flow to step 506, in which the user may specify the details of the extensible use.

Once either or both cases of 502 or 504 are complete, the creation or modification of metadata would take place at step 506. Once complete, the metadata updates with the new configurations are persisted back to the metadata library 102 at step 508. The updated metadata then would be available to metadata orchestrator 104 and metadata orchestrator 104 would be run at step 510. Likewise, cascading results of the inquires at 502 and 504 may lead to an eventual running of metadata orchestrator 104 at step 510.

Without most any additional coding performed by the user, and driven by the metadata, metadata orchestrator 104 at step 512 generates java code related to the item(s) being processed. Along with this code generation, at step 514 metadata orchestrator 104 also generates API documentation (through for example API generator 112, as shown in FIG. 1).

In other words, the user supplied metadata concerning the desired update checks for existing presence in the metadata library and/or changes to an item for extensibility, if not present (or extensibility is possible), user may be guided to supply the configuration details, and then the metadata orchestrator leverages the identified metadata to dynamically provide code to the UI and present the data properly, with no specific code written by the user. Documentation may be either the technical details or may be along the lines of user help documentation. Documentation may further be outputted in a number of ways, from being captured in PDF format, to being displayed on the user device. For cases of customizing extensible terms, a similar path may be followed.

Depending on the adaptor, step 516 dynamically provides, for various examples, for the UI edits, updates to security and piping from the backend. It is to be appreciated that the actions of metadata orchestrator 104 are agnostic to the backend of the system, At 518 the solution is deployed to the hosting environment, typically through the various connected adaptors, adaptors 1, 2, . . . N 106, for example.

Figure 6:
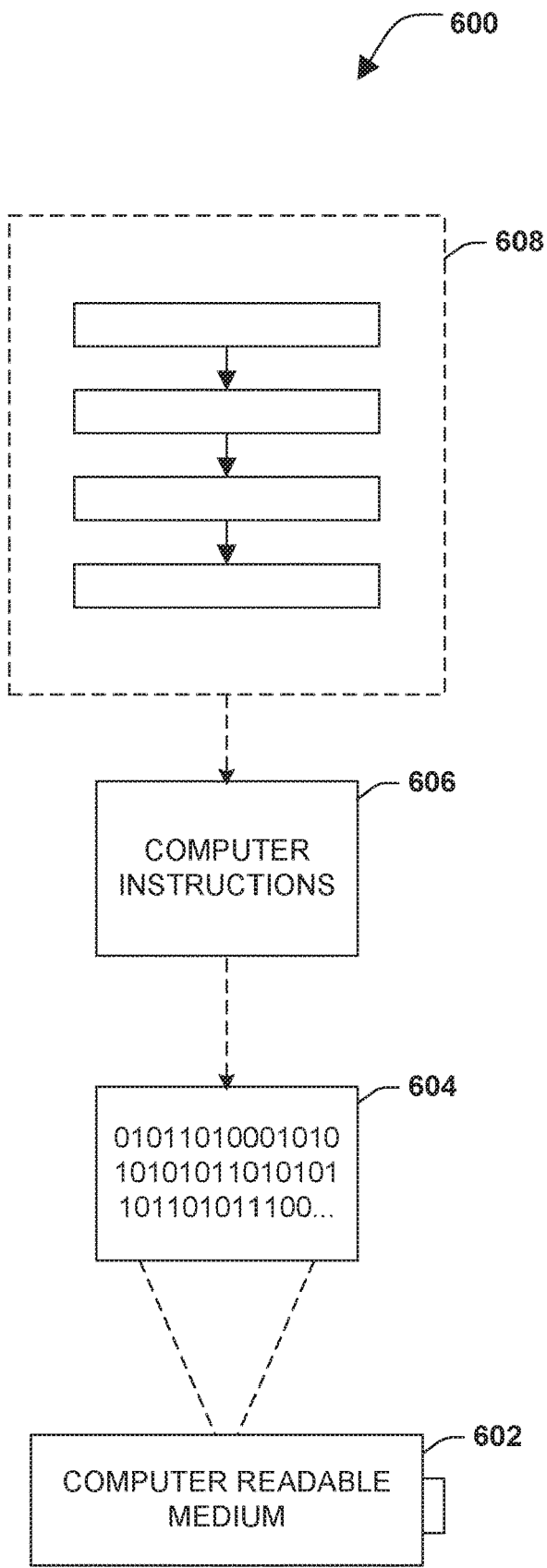
FIG. 6 is an illustration of an example computing environment where one or more of the provisions set forth herein can be implemented, according to one or more embodiments.

Still another embodiment involves a computer-readable medium including processor-executable instructions configured to implement one or more embodiments of the techniques presented herein. An embodiment of a computer-readable medium or a computer-readable device devised in these ways is illustrated in FIG. 6, wherein an implementation 600 includes a computer-readable medium 602, such as a CD-R, DVD-R, flash drive, a platter of a hard disk drive, etc., on which is encoded computer-readable data 604. This computer-readable data 604, such as binary data including a plurality of zero's and one's as shown in 604, in turn includes a set of computer instructions 606 configured to operate according to one or more of the principles set forth herein. In one such embodiment 600, the processor-executable computer instructions 606 may be configured to perform a method 608, such as the method 800 of FIG. 8. In another embodiment, the processor-executable instructions 606 may be configured to implement a system, such as the system 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or most any combination thereof to control a computer to implement the disclosed subject matter. The term "article of manufacture" as used herein is intended to encompass a computer program accessible from most any computer-readable device, carrier, or media. Of course, many modifications may be made to this configuration without departing from the scope or spirit of the claimed subject matter.

Figure 7:
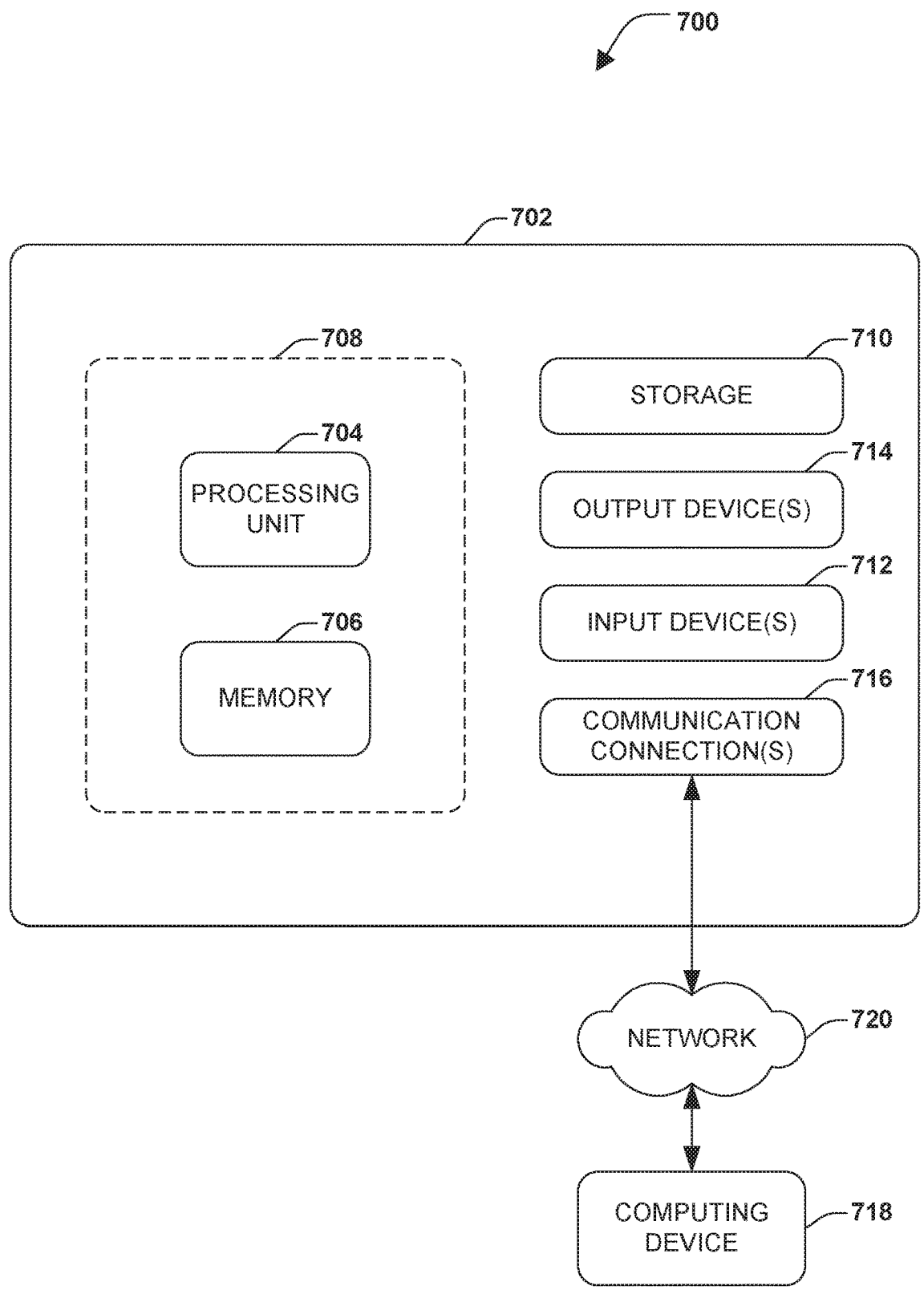
FIG. 7 is an illustration of an example computing environment where one or more of the provisions set forth herein can be implemented, according to one or more embodiments.

FIG. 7 and the following discussion provide a description of a suitable computing environment to implement embodiments of one or more of the provisions set forth herein. The operating environment of FIG. 7 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as discussed herein. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 7 illustrates a system 700 including a computing device 702 configured to implement one or more embodiments provided herein. In one configuration, computing device 702 includes at least one processing unit 704 and memory 706. Depending on the exact configuration and type of computing device, memory 706 may be volatile, such as RAM, non-volatile, such as ROM, flash memory, etc., or a combination of the two. This configuration is illustrated in FIG. 7 by dashed line 708.

In other embodiments, device 702 includes additional features or functionality. For example, device 702 may include additional storage such as removable storage or non-removable storage, including, but not limited to, magnetic storage, optical storage, etc. Such additional storage is illustrated in FIG. 7 by storage 710. In one or more embodiments, computer readable instructions to implement one or more embodiments provided herein are in storage 710. Storage 710 may store other computer readable instructions to implement an operating system, an application program, etc. Computer readable instructions may be loaded in memory 706 for execution by processing unit 704, for example.

The term "computer readable media" as used herein includes computer storage media. Computer storage media includes volatile and nonvolatile, removable and non-removable media implemented in any method or technology for storage of information such as computer readable instructions or other data. Memory 706 and storage 710 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by device 702. Any such computer storage media is part of device 702.

Device 702 includes input device(s) 712 such as keyboard, mouse, pen, voice input device, touch input device, infrared cameras, video input devices, or any other input device. Output device(s) 714 such as one or more displays, speakers, printers, or any other output device may be included with device 702. Input device(s) 712 and output device(s) 714 may be connected to device 702 via a wired connection, wireless connection, or any combination thereof. In one or more embodiments, an input device or an output device from another computing device may be used as input device(s) 712 or output device(s) 714 for computing device 702. Device 702 may include communication connection(s) 716 to facilitate communications with one or more other devices 718, and such communication may occur over a network, for example network 720.

Although, in accordance with some aspects, the subject matter has been described herein in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
executing, on a processor, instructions that cause the processor to perform operations comprising:
generating JAVA code in a platform-dependent programming language automatically that enables metadata-based interaction with a data store by way of a platform independent framework, wherein metadata maps to location and captures characteristics of data entities in the data store;
producing documentation automatically based on the metadata, wherein the documentation comprises at least one of application programming interface (API) data, data definitions, or end-user help document;
generating source code by the metadata-based interaction for service and functions without development of custom or User Interface (UI) of the generated JAVA code by a user; and
deploying to a hosting environment.

2. The method of claim 1, the operations further comprising generating the code with an adaptor coupled with a metadata orchestrator.

3. The method of claim 2, the operations further comprising generating the code with a dedicated-purpose adaptor.

4. The method of claim 2, the operations further comprising generating the code with, the adaptor coupled with the metadata orchestrator that centralizes access control to the data store and the metadata.

5. The method of claim 1, the operations further comprising generating the code in response to a change in the metadata.

6. The method of claim 1, the operations further comprising generating the code based on metadata of data items specified by an application.

7. The method of claim 1, the operations further comprising generating test code based on metadata of data items specified by an application.

8. The method of claim 1, the operations comprising generating the code that performs one or more of create, read, write, or delete of one or more data items in the data store.

9. A system, comprising:
a processor coupled to a memory that stores instructions that when executed by the processor cause the processor to:
generate JAVA code in a platform-dependent programming language automatically that enables metadata-based interaction with a data store by way of a platform independent framework, wherein metadata maps to location and captures characteristics of data entities in the data store;
produce documentation automatically based on the metadata, wherein the documentation comprises at least one of application programming interface (API) data, data definitions, or end-user help document;
generate source code by the metadata-based interaction for service and functions without development of custom or User interface (UI) of the generated JAVA code by a user; and
deploy to a hosting environment.

10. The system of claim 9, wherein the instructions further cause the processor to generate the code with an adaptor coupled with a metadata orchestrator.

11. The system of claim 10, wherein the adaptor is a dedicated-purpose adaptor.

12. The system of claim 10, wherein the metadata, orchestrator centralizes access control to the data store and the metadata.

13. The system of claim 9, wherein the instructions further cause the processor to generate the code in response to a change in the metadata.

14. The system of claim 9, wherein the Instructions further cause the processor to generate the code based on metadata of data items specified by an application.

15. The system of claim 9, wherein the instructions further cause the processor to generate test code based on metadata of data, items specified by an application.

16. The system of claim 9, wherein the code performs one or more of create, read, write, or delete of one or more data items in the data store.

17. A metadata-driven system, comprising:
a processor that executes the following computer executable components stored in a memory;
a metadata orchestrator that centralizes control of a metadata library and data store based on metadata;

one or more adaptors that generates platform specific code based on metadata received from the metadata orchestrator; and a generator that produces user documentation including application programming interface (API) data;

wherein the metadata orchestrator generates source code through the one or more adaptors for service and functions without development of custom or User Interface (UI) of the generated platform specific code by a user, and deploys to a hosting environment.

18. The system of claim 17, wherein the metadata orchestrator maps data entities to data store locations.

19. The system of claim 17, where the code is generated based on metadata of data items specified by an application.

20. The system of claim 17, wherein tire metadata orchestrator generates test code based on metadata of data items specified by an application.

\* \* \* \* \*